United States Patent
Qi et al.

(10) Patent No.: US 9,036,109 B2
(45) Date of Patent: May 19, 2015

(54) ELECTRONIC DEVICE WITH THERMALLY MATCHED LIGHT GUIDE PLATE

(75) Inventors: Jun Qi, Cupertino, CA (US); Victor H. Yin, Cupertino, CA (US); Wei Chen, Palo Alto, CA (US); Dinesh C. Mathew, Fremont, CA (US); Bryan W. Posner, La Selva Beach, CA (US); Adam T. Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 13/590,002

(22) Filed: Aug. 20, 2012

(65) Prior Publication Data

US 2014/0049727 A1 Feb. 20, 2014

(51) Int. Cl.
G02F 1/1333 (2006.01)
G02F 1/1335 (2006.01)
G09F 13/18 (2006.01)
F21V 8/00 (2006.01)

(52) U.S. Cl.
CPC .............. *G09F 13/18* (2013.01); *G02B 6/0001* (2013.01)

(58) Field of Classification Search
CPC ................................................ G02F 1/133615
USPC ..................................................... 349/58, 65
See application file for complete search history.

(56) References Cited

U.S. PATENT DOCUMENTS

| | | | | |
|---|---|---|---|---|
| 5,324,767 A | * | 6/1994 | Koyama et al. | 524/493 |
| 5,352,724 A | * | 10/1994 | Fujiki et al. | 524/398 |
| 5,434,199 A | * | 7/1995 | Gallagher et al. | 523/400 |
| 5,714,537 A | * | 2/1998 | Laughner et al. | 524/445 |
| 5,936,494 A | | 8/1999 | Pollock | |
| 6,064,455 A | * | 5/2000 | Kim | 349/113 |
| 6,124,906 A | * | 9/2000 | Kawada et al. | 349/65 |
| 6,375,336 B1 | * | 4/2002 | Suzuki et al. | 362/603 |
| 6,454,452 B1 | * | 9/2002 | Sasagawa et al. | 362/561 |
| 6,485,157 B2 | * | 11/2002 | Ohkawa | 362/625 |
| 6,486,999 B1 | | 11/2002 | Ackerman et al. | |
| 7,068,261 B2 | | 6/2006 | Kubo et al. | |

(Continued)

FOREIGN PATENT DOCUMENTS

EP 2385398 3/2004

OTHER PUBLICATIONS

"Light-Guide Plate (LGP) Wall Painting," StellarJet, (product website, 2 pages) [Retrieved on Oct. 24, 2012]. Retrieved from the Internet: <URL: http://www.gccstellarjet.com/en/showcase_detail.php?ID=English_100107022804>.

*Primary Examiner* — James Dudek
(74) *Attorney, Agent, or Firm* — Treyz Law Group; G. Victor Treyz; Kendall P. Woodruff

(57) ABSTRACT

Electronic device backlight structures may be used to provide backlight for a display. The backlight structures may include a light source such as an array of light-emitting diodes. Light from the light source may be coupled into an edge of a light guide plate. The light guide plate may distribute the light laterally across the display. The light guide plate and other display structures may be mounted in an electronic device housing such as a metal housing having metal housing walls. A gap may separate an edge of the light guide plate from the metal housing walls. Mismatch between the coefficients of thermal expansion of the housing and the light guide plate may be minimized to minimize the size of the gap. The light guide plate may be formed from a layer of glass with printed light-scattering structures or from polymer with a filler and molded or printed light-scattering structures.

20 Claims, 10 Drawing Sheets

(56) References Cited

U.S. PATENT DOCUMENTS

| | | | |
|---|---|---|---|
| 7,901,125 B2 * | 3/2011 | Iwasaki | 362/628 |
| 2006/0146569 A1 | 7/2006 | Huang et al. | |
| 2008/0137004 A1 | 6/2008 | Iwasaki et al. | |

* cited by examiner

ELECTRONIC DEVICE WITH THERMALLY MATCHED LIGHT GUIDE PLATE

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may have display layers for displaying images. Backlight structures may be included in the display. The backlight structures may provide backlight that illuminates the display layers in the display that are displaying an image for a user.

The display backlight structures may include a light source such as an array of light-emitting diodes. Light from the light source may be coupled into an edge of a light guide plate. The light guide plate may be used to distribute the backlight laterally across the display. Light-scattering structures on the backlight may be used to scatter the backlight from the light guide plate through the display layers.

The light guide plate and other display structures may be mounted in an electronic device housing such as a metal housing having metal housing walls. A gap may separate an edge of the light guide plate from the housing walls. The housing walls and the light guide plate may be characterized by respective coefficients of thermal expansion. Mismatch between the coefficients of thermal expansion for the housing and the light guide plate may be minimized to allow minimization of the size of the gap.

The light guide plate may be formed from a layer of glass having a coefficient of thermal expansion that is matched to the coefficient of thermal expansion for the housing. Light-scattering structures such as printed light-scattering structures may be formed on glass layer to promote scattering of the backlight. If desired, the light guide plate may be formed from a sheet of polymer. Filler such as glass particles may be incorporated into the polymer to ensure that the coefficient of thermal expansion for the polymer is matched to the coefficient of thermal expansion for the electronic device housing. Light-scattering structures such as protrusions or depressions or other light-scattering features may be formed on the polymer sheet.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
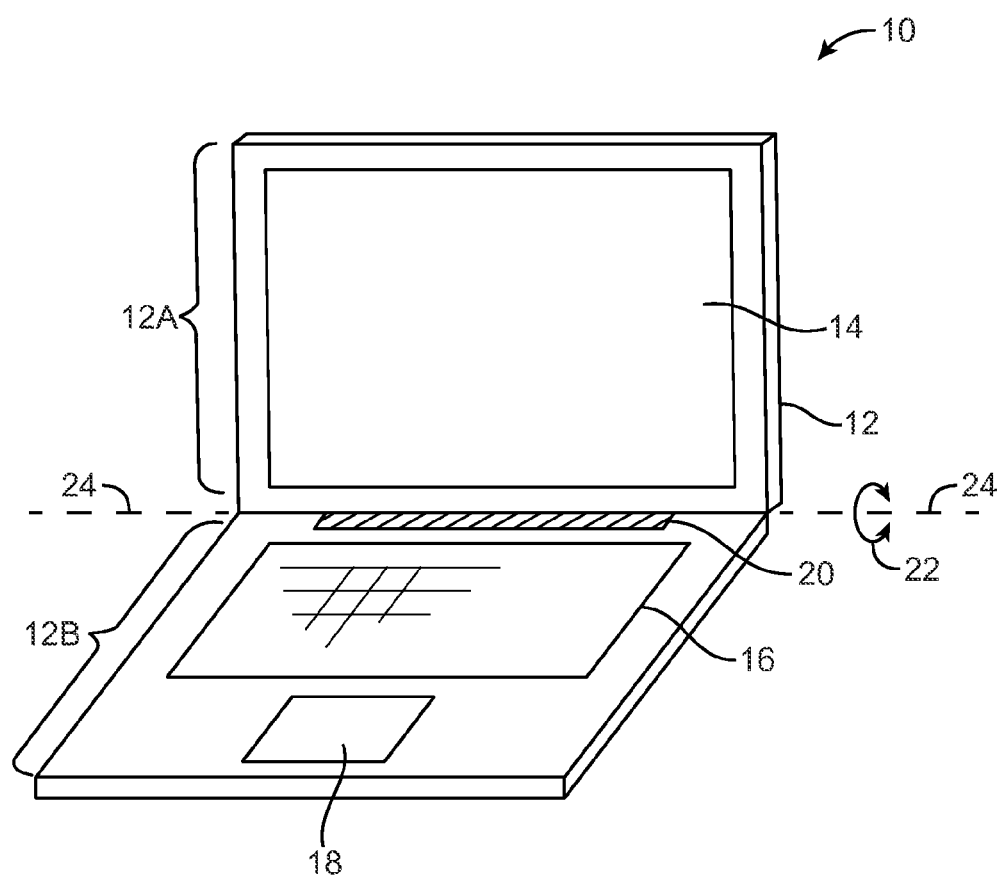
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
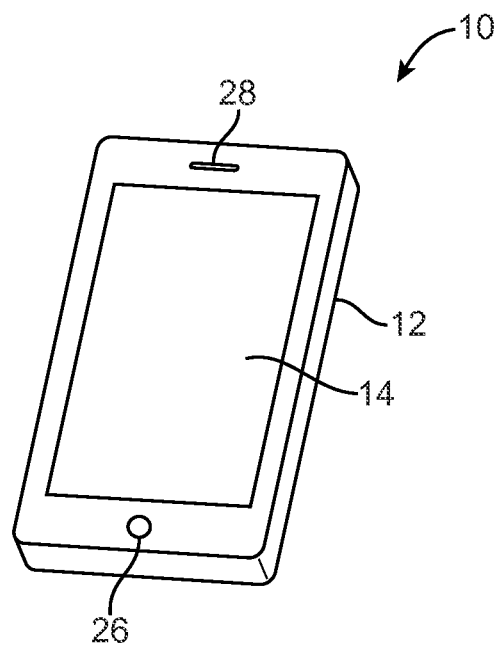
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
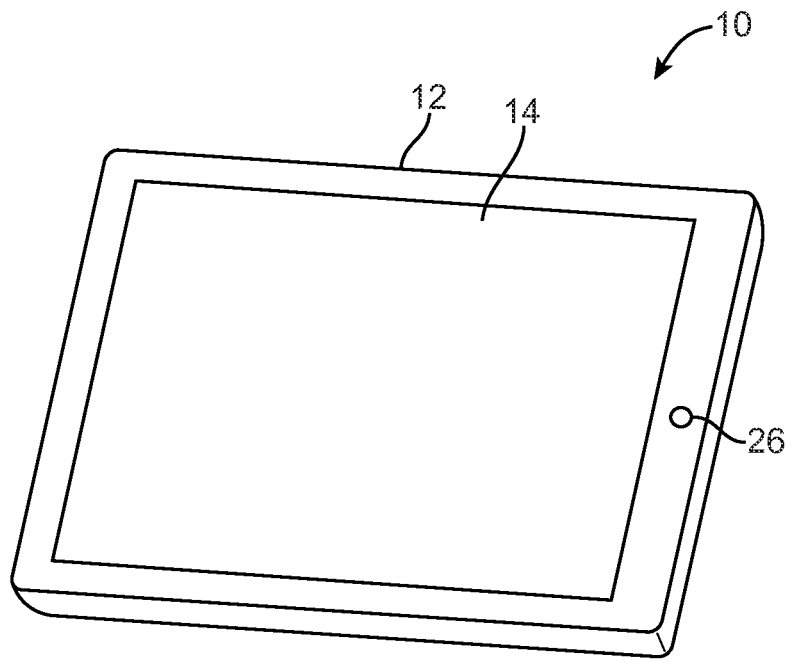
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
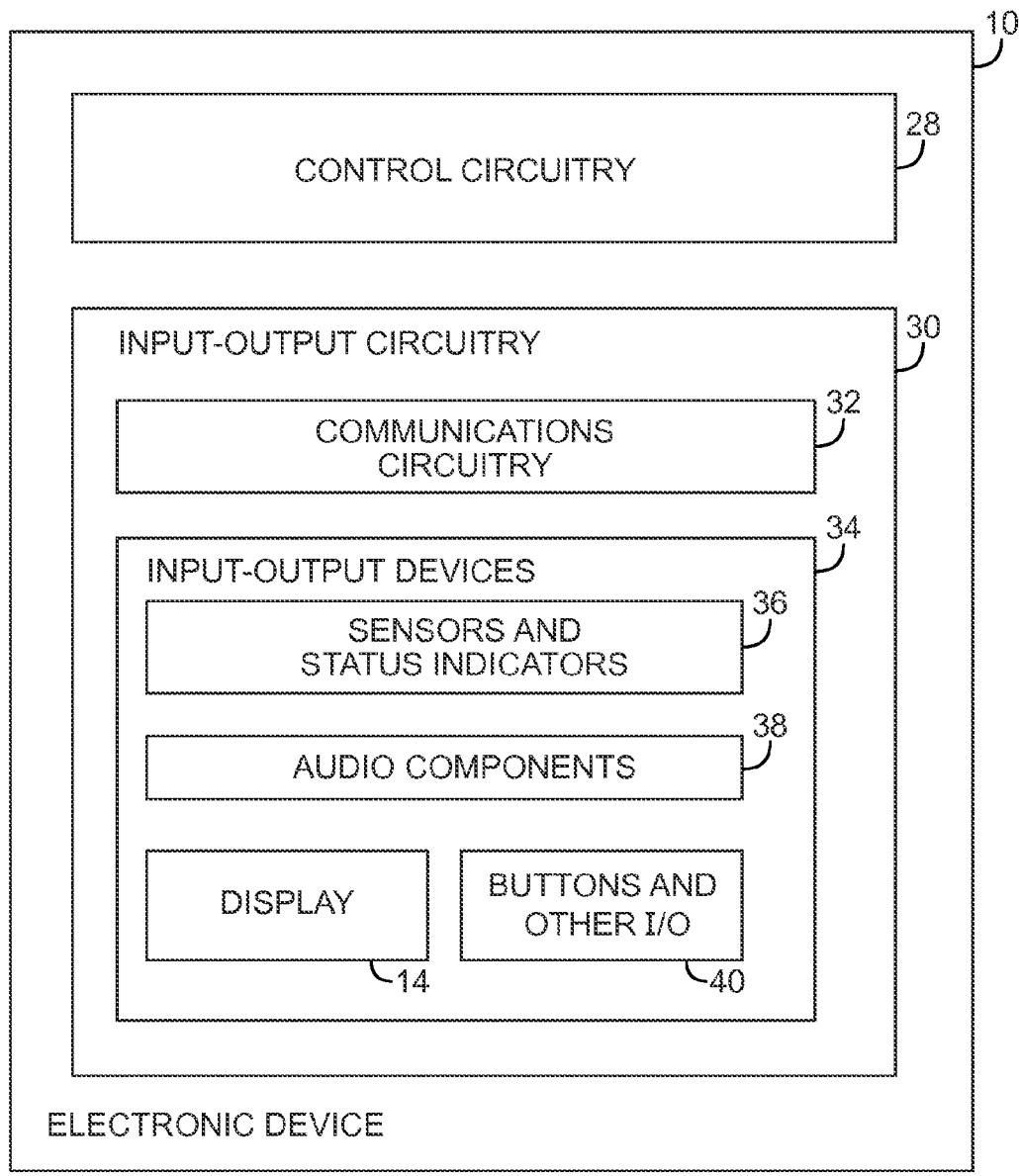
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 28. Control circuitry 28 may include storage and processing circuitry for controlling the operation of device 10. Control circuitry 28 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 28 may include processing circuitry based on one or more microprocessors, microcontrollers, digital signal processors, baseband processors, power management units, audio codec chips, application specific integrated circuits, etc.

Control circuitry 28 may be used to run software on device 10, such as operating system software and application software. Using this software, control circuitry 28 may present information to a user of electronic device 10 on display 14. When presenting information to a user on display 14, sensor signals and other information may be used by control circuitry 28 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
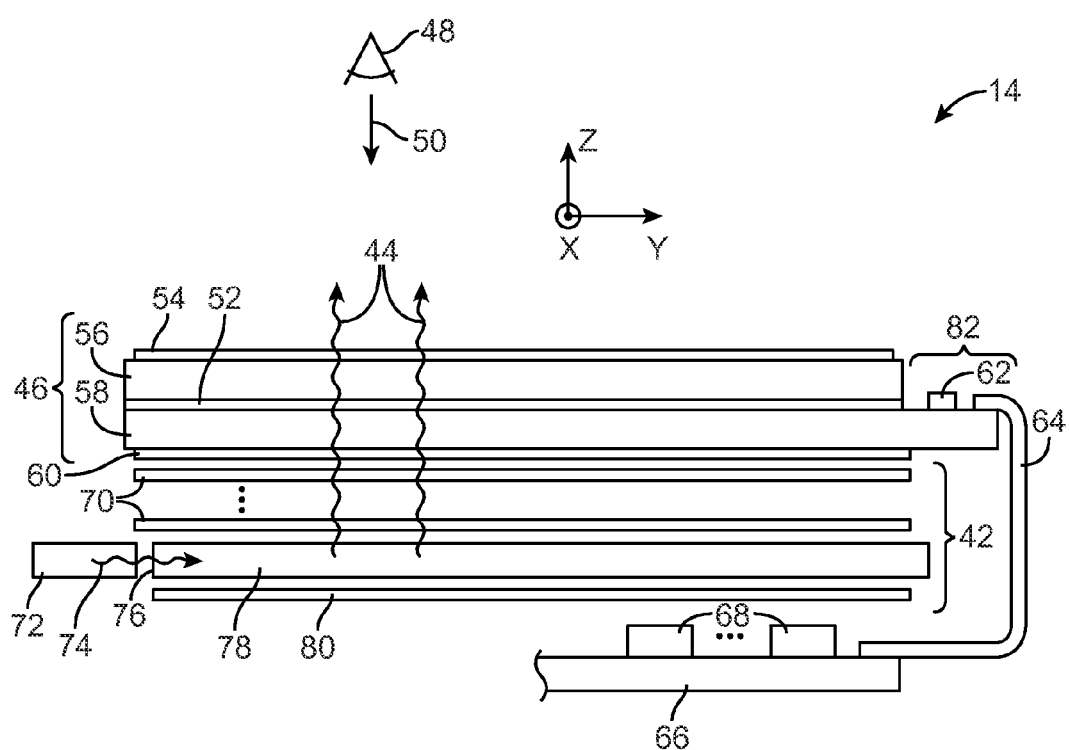
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 28 (e.g., one or more integrated circuits such as components 68 on printed circuit 66 of FIG. 5) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
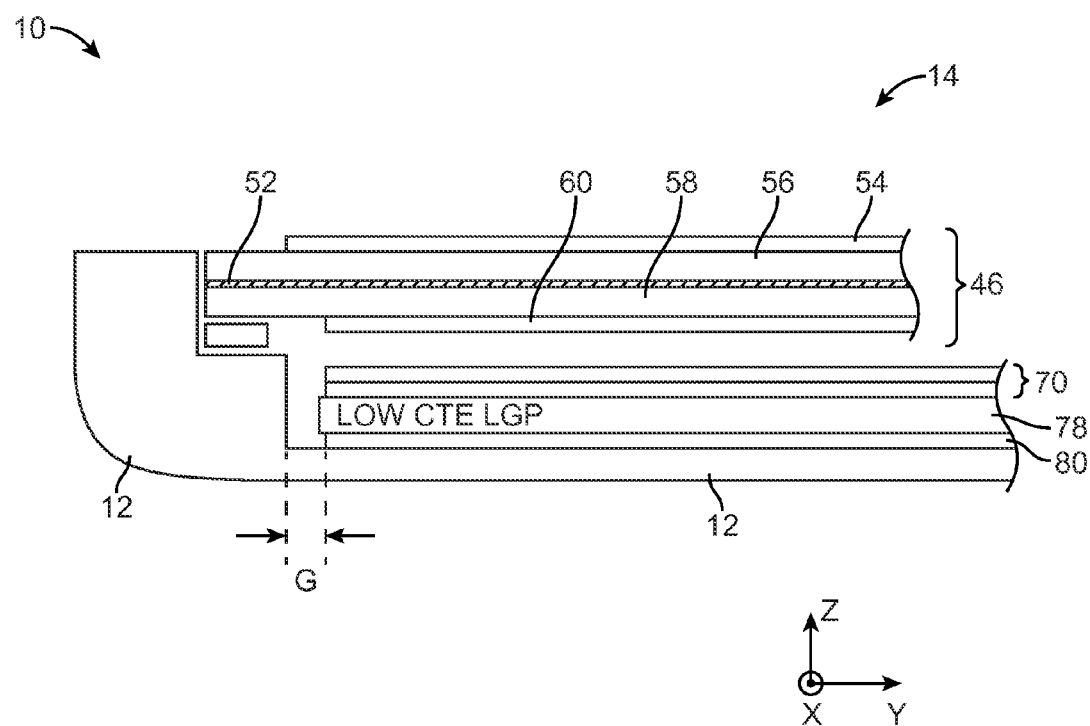
FIG. 6 is a cross-sectional side view of an electronic device with a display having a gap between a light guide plate edge and a device structure such as a housing wall in accordance with an embodiment of the present invention.

Light guide plate 78 may have a rectangular footprint when viewed in direction 50 of FIG. 5. With this type of configuration, light guide plate 78 may have a rectangular periphery with four straight edges. As shown in FIG. 6, light guide plate 78 may be mounted in housing 12 so that there is a gap G between at least some of the outermost edges of light guide plate 78 and the opposing inner edges of housing 12. The use of a non-zero gap G along the edges of light guide plate 78 can help accommodate differences in the rate of expansion between light guide plate 78 and housing 12 in lateral dimensions X and Y as device 10 is subjected to changes in temperature during operation.

It may be desirable to operate device 10 over a range of operating temperatures from a low operating temperature of T1 to a high operating temperature of T2. The value of T1 may be, for example, 0° C., −30° C., −10° C., etc. The value of T2 may be, for example, 100° C., 90° C., or 60° C., etc. With one suitable arrangement, the temperature range over which device 10 is designed to operate satisfactorily may be −20° C. to 85° C. (as an example). When operating over a range of temperatures (e.g., over a range of temperatures spanning 50° C. or more, 80° C. or more, or 100° C. or more), housing 12 and the layers in display 14 may expand and contract.

Housing 12 may be formed from a material that has a first coefficient of thermal expansion (CTE) such as CTE1, whereas display layers such as light guide plate 78 may have a second coefficient of thermal expansion CTE2. The amount of mismatch between the values of CTE1 and CTE2 affects the minimum acceptable size for gap G. Consider, as an example, a situation in which CTE1 and CTE2 are both positive and in which CTE2 is greater than CTE1. This type of scenario may arise, for example, when housing 12 is formed from a material such as metal (e.g., aluminum, which has a CTE value of about 20 ppm) and when light guide plate 10 is formed from a polymer (e.g., polymethyl methacrylate, which has a CTE value of about 65 ppm). In this type of configuration, light guide plate 78 and housing 12 will both expand laterally in dimensions X and Y when heated. If gap G is too small, light guide plate 78 will expand so much relative to housing 12 that the outer edge of light guide plate 78 will run the risk of contacting the opposing inner surface of housing 12 at higher temperatures, thereby potentially damaging light guide plate 78 and display 14. Although gap G may be enlarged to help avoid this type of failure, excessive gap size can lead to undesirable increases in the size of device 10.

To help minimize the size of gap G and thereby implemented display 14 and device 10 in a compact arrangement, housing 12 and display layers such as light guide plate 78 may be configured to exhibit coefficients of thermal expansion that do not differ significantly. As an example, housing 12 and some or all of the display layers in display 14 such as light guide plate 78 may be configured so that CTE2 is within 100% of CTE1 (i.e., if CTE2 is between 0 and 40 ppm when CTE1 is 20 ppm), so that CTE2 is within 70% of CTE1, so that CTE2 is within 50% of CTE1, so that CTE2 is within 30% of CTE1, so that CTE2 is within 20% of CTE1, so that CTE2 is within 10% of CTE1, so that CTE2 is within 5% of CTE1, or so that CTE2 is within 1% of CTE1. With this type of close match between the coefficients of thermal expansion, the magnitude of (CTE2−CTE1)/CTE1 may be less than 2.5, less than 2, less than 1.5, less than 1, less than 0.5, less than 0.2, or less than 0.1 (as examples).

In configurations in which the coefficient of thermal expansion of housing 12 and light guide plate 78 are closely matched, housing 12 and light guide plate 78 will exhibit comparable changes in size (e.g., in the X-Y plane that lies parallel to the other layers of display 14). By exhibiting comparable changes in size with changes in temperature, situations can be avoided in which light guide plate 78 bridges gap G and is forced against housing 12 sufficiently to cause damage.

Housing 12 may be formed from ceramic, glass, polymer (e.g., carbon-fiber-filled polymer, plastic without fillers, or other materials), metal, other materials, or combinations of two or more of these materials. As an example, consider the use of a material such as aluminum or other metals in forming housing 12. In this type of configuration, housing 12 may exhibit a coefficient of thermal expansion CTE2 of 20 ppm (parts per million). The size of gap G may be minimized (e.g., to a value of less than 2 mm, less than 1 mm, less than 0.5 mm, less than 0.3 mm, or less than 0.1 mm) by ensuring that light guide plate 78 is formed from a material such as glass or a polymer filled with a filler that ensures that the coefficient of thermal expansion of light guide plate 78 is satisfactorily matched to that of housing 12.

As an example, light guide plate 78 may be formed from a glass that has a coefficient of thermal expansion of about 5-30 ppm, 10-20 ppm, or other suitable value.

As another example, light guide plate 78 may be formed from a material such as a polymer (e.g., polymethylmethacrylate, polycarbonate, etc.) into which a filler material has been incorporated to help match the coefficient of thermal expansion of the light guide plate to that of housing 12 (e.g., to ensure that the coefficient of thermal expansion of the filled polymer is 20-30 ppm, or 0-35 ppm, or other suitable value).

To ensure that light 76 (FIG. 5) is satisfactorily scattered out of light guide plate 78 to serve as backlight 44, it may be desirable to form light scattering structures on light guide plate 78. It may, as an example, be desirable to form ridges, bumps, or other protrusions or to form pits, troughs, or other depressions in the surface of light guide plate 78. Additional structures such as structures formed from polymer (e.g., white ink) or other materials may also be formed on one or both of the opposing surfaces of light guide plate 78 to serve as light scattering structures. If desired, a combination of protrusions and/or depressions may be formed on one or both surfaces of the light guide plate in addition to forming optional printed surface features such as printed white ink structures on one or both of the surfaces of light guide plate 78. Other types of light scattering structures may also be used to help ensure that light is scattered from light guide plate 78 during use. The use of protrusions, depressions, and surface ink features is merely illustrative.

Figure 7:
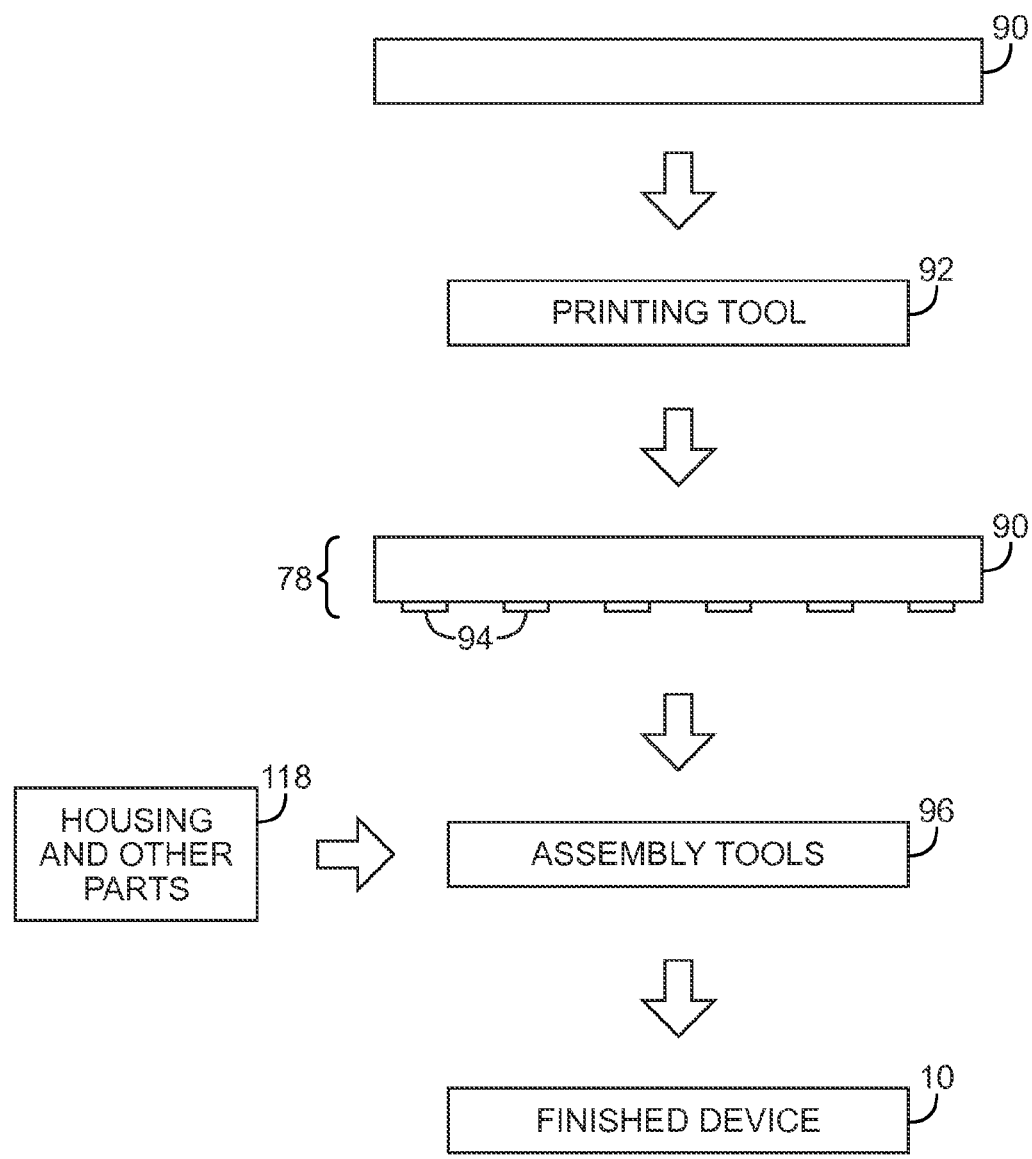
FIG. 7 is a diagram showing how printing and assembly equipment may be used in forming a backlight light guide plate for a display and may be used in incorporating the display into an electronic device in accordance with an embodiment of the present invention.

FIG. 7 is a diagram showing how equipment such as a printing tool may be used in forming light scattering features on light guide plate 78. This type of approach may be used when light guide plate 78 is formed from glass or when light guide plate is formed from filled plastic.

Initially, an uncoated planer layer of glass or filled polymer may be formed such as layer 90. Layer 90 may have lateral dimensions X and Y that are sufficient to form display 14 or may be a larger panel from which display-sized layers are subsequently formed using a cutting process. The thickness of layer 90 may be about 0.1 to 3 mm (as an example).

Deposition equipment such as printing tool 92 may be used to deposit a pattern of light scattering structures 94 on one or both surfaces of light guide plate substrate layer 90, thereby forming light guide plate 78. Tool 92 may be an ink-jet printer, screen printing equipment, or other equipment for forming a patterned layer of light scattering structures 94 on one or both surfaces of light guide plate substrate 90. As an example, tool 92 may include pad printing equipment, equipment for depositing structures 94 using spraying, spinning, dripping, painting, photolithography, or other deposition tools.

The material of layer 90 may include a polymer (e.g., a clear resin) in which a coloring material (e.g., a white pigment or dye or a material of other colors) is incorporated. With one suitable configuration, which may sometimes be described herein as an example, the material of layer 94 may be white ink. This is, however, merely illustrative. In general, any suitable material for forming printed light scattering structures 94 may be used.

An advantage of forming light scattering structures 94 in the form of printed surface structures or a patterned layer of light-scattering structures deposited using other such techniques is that it is not necessary to form protrusions or depressions in layer 90, thereby simplifying processing, particularly when layer 90 is formed from a hard material such as glass. If desired, structures such as structures 94 of FIG. 7 may also be formed when substrate 90 is formed from a softer material such as a polymer.

Following formation of light guide plate 78, light guide plate 78, other layers of display 14, housing 12, and other parts in electronic device 10 (shown as parts 118 of FIG. 7) may be assembled using assembly equipment 96, thereby forming finished electronic device 10.

Figure 8:
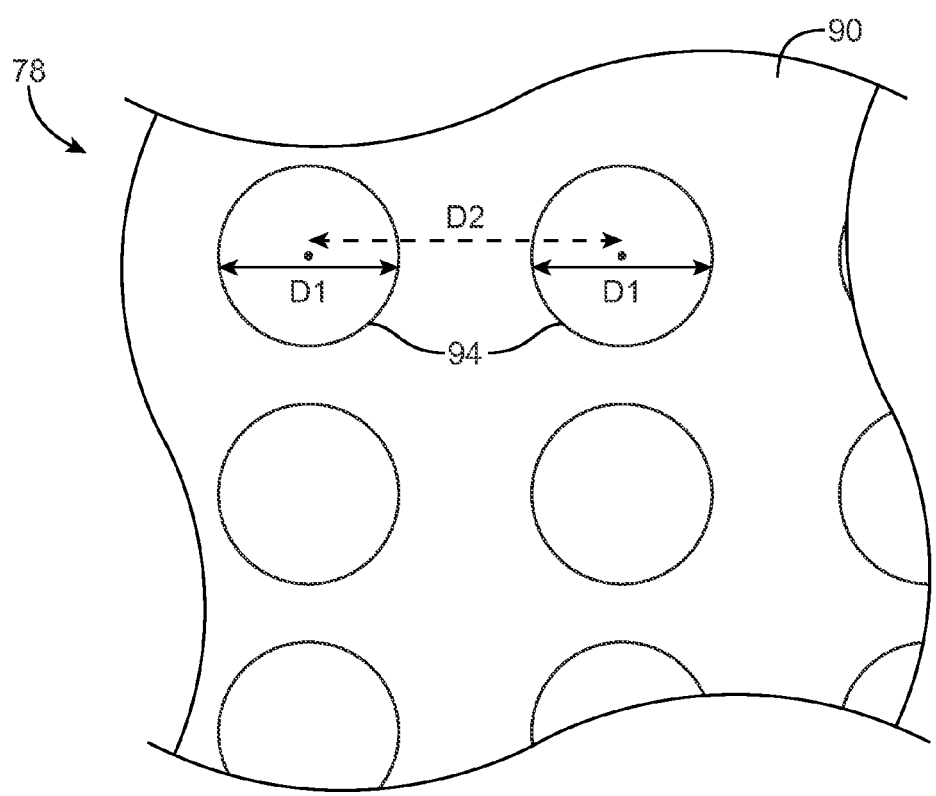
FIG. 8 is a bottom view of an illustrative light guide plate with printed light scattering features in accordance with an embodiment of the present invention.

FIG. 8 is a top (bottom) view of light guide plate 78 in an illustrative configuration in which light scattering structures 94 have been implemented in the form of an array of circular dots. Structures 94 may have a diameter D1 and may be characterized by a center-to-center spacing D2. The value of D1 may be, for example, 200 microns, 100-300 microns, less than 500 microns, less than 400 microns, less than 300 microns, or less than 100 microns (as examples). Structures may have shapes other than circles (e.g., rectangles, shapes with combinations of curved and straight edges, shapes with curved edges, shapes with straight edges, ovals, irregular shapes, etc.). The use of circular shapes for structures 94 is merely illustrative. Center-to-center spacing D2 may be 0-1 mm (e.g., a value in the range of 100-300 microns, etc.), 1-2 mm, or more than 1 mm (as examples). There may be an array of structures 94 on light guide plate substrate 90 or structures 94 may be formed in an irregular pattern. Light-scattering structures 94 may be uniformly distributed or may be provided with a density gradient (e.g., a gradient that compensates for the decreasing intensity of light 74 as light 74 propagates through light guide plate 78).

To ensure that a polymer material has a coefficient of thermal expansion that matches that of housing 12, filler may be added to a polymer resin. The filler may include beads of filler material, filler material fibers, or other types of filler particles. The filler may have a coefficient of thermal expansion that is less than that of the polymer resin into which it is being incorporated. As an example, the filler may be formed from a glass such as fused silica that has a coefficient of thermal expansion that is about 0 ppm or that is negative. By balancing the amount of filler that is incorporated into the polymer during the formation of the substrate for light guide plate 78, the coefficient of thermal expansion for the light guide plate can be matched to that of housing 12.

Figure 9:
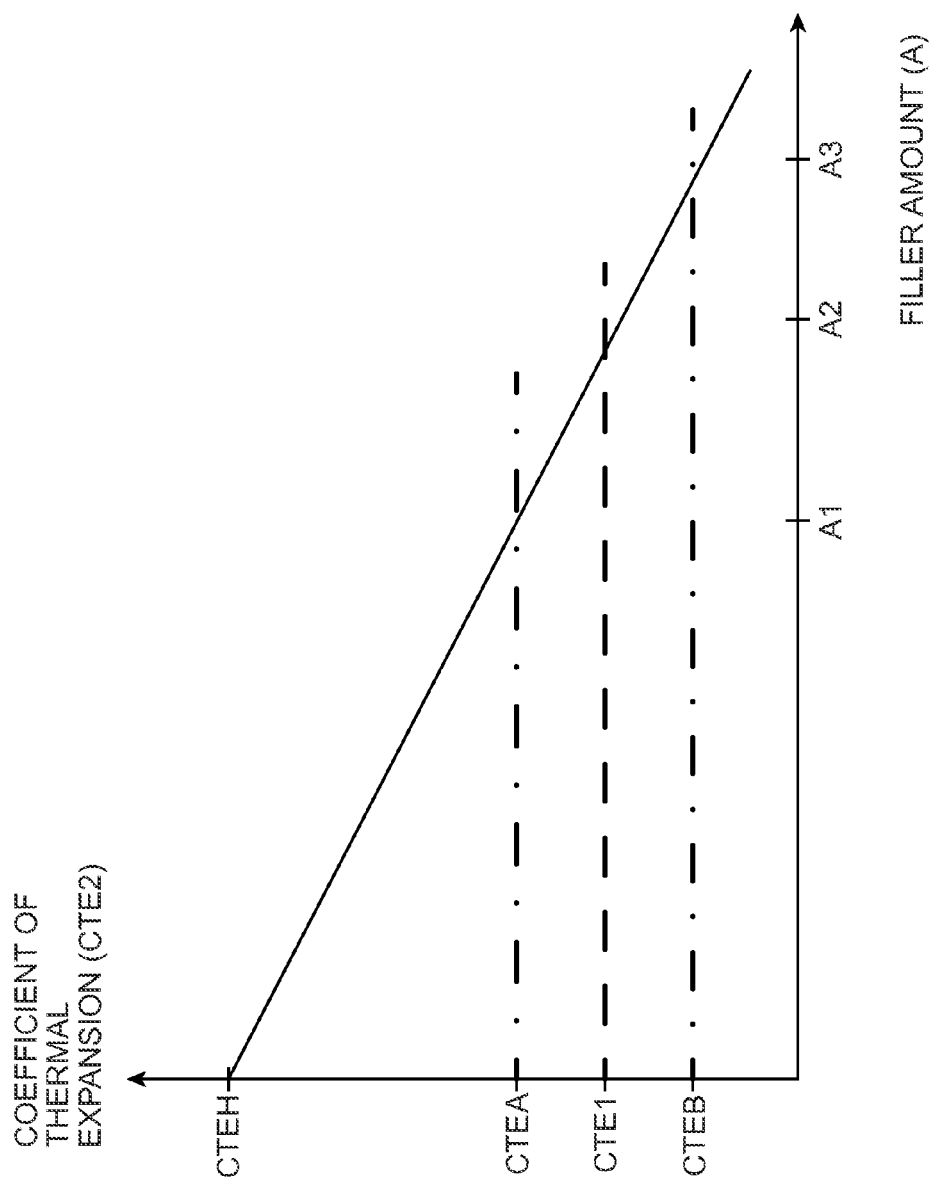
FIG. 9 is a graph showing how the coefficient of thermal expansion of a polymer light guide plate may be adjusted by controlling the amount of filler material that is incorporated into a polymer resin that forms the polymer light guide plate in accordance with an embodiment of the present invention.

FIG. 9 is a graph showing how the coefficient of thermal expansion CTE2 of the material of light guide plate 78 can be adjusted as a function of added filler amount A. When no filler is included in the light guide plate polymer, the value of CTE2 exhibits a relatively high value of CTEH (e.g., 65 ppm). As filler such as beads, fibers, or other particles of fused silica or other filler material is added to the polymer (e.g., in quantities such as 0-10%, 0-30%, less than 5%, or greater than 5%), the value of CTE2 will tend to be reduced towards the value of CTE1 that is exhibited by housing 12.

If, for example, an amount A2 of filler is included in the polymer, the polymer will exhibit a value of CTE2 that is equal to that of CTE1 (i.e., light guide plate 78 and housing 12 will have matched coefficient of thermal expansion values). Other amounts of incorporated filler (e.g., amounts between A1 and A3) may also produce acceptable results (e.g., coefficients of thermal expansion that range between a low value of CTEB and a high value of CTEA). CTEA and CTEB may be within +/−100% of CTE1, within 30% of CTE1, or within 10% of CTE1 (as examples). As an example, if CTE1 is about 20 ppm, CTE2 may be about 0-40 ppm, 20-40 ppm, or 20-30 ppm. Using values of CTE1 such as these, the magnitude of (CTE2−CTE1)/CTE1 may be less than 2.5, less than 2, less than 1.5, less than 1, less than 0.5, less than 0.2, or less than 0.1 (as examples).

Light guide plate 78 may have light scattering structures that are formed from protrusions or depressions in addition to or instead of using printed surface structures such as structures 94 of FIG. 7. The protrusions may include bumps, ribs, circular bumps, triangular bumps, irregularly shaped bumps, or other protruding structures. Depressions may include pits, circular pits, triangular pits, irregularly shaped pits, troughs, or other depressed structures. If desired, one or more surface of light guide plate 78 may include a combination of two or more surface features such as protrusions, depressions, printed surface features, or other light scattering structures.

Figure 10:
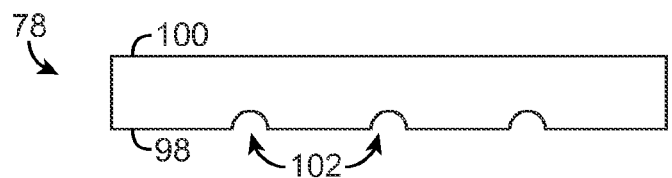
FIG. 10 is a cross-sectional side view of an illustrative light guide plate with light scattering pits on one of its surfaces in accordance with an embodiment of the present invention.

FIG. 10 is a cross-sectional side view of light guide plate 78 in a configuration in which light guide plate 78 has been provided with a surface such as surface 98 that has a pattern of light-scattering depressions 102 and an opposing surface such as surface 100 that is free of light-scattering structures. Surface 98 may be the lower surface of light guide plate 78 and surface 100 may be the upper surface of light guide plate 78 or surface 98 may be the upper surface of light guide plate 78 and surface 100 may be the lower surface of light guide plate 78.

Figure 11:
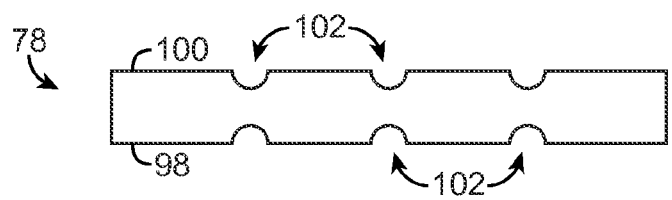
FIG. 11 is a cross-sectional side view of an illustrative light guide plate with light scattering pits on both of its surfaces in accordance with an embodiment of the present invention.

In the illustrative configuration of FIG. 11, surface 100 of light guide plate 78 has been provided with light-scattering depressions 102 and surface 98 has been provided with light-scattering depressions 102.

Figure 12:
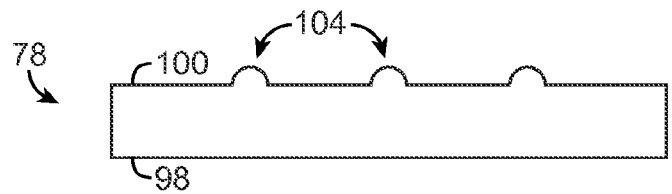
FIG. 12 is a cross-sectional side view of an illustrative light guide plate with light scattering bumps on one of its surfaces in accordance with an embodiment of the present invention.

The illustrative arrangement for light guide plate 78 that is shown in FIG. 12, surface 100 has been provided with light-scattering protrusions 104 and surface 98 is free of light-scattering structures.

Figure 13:
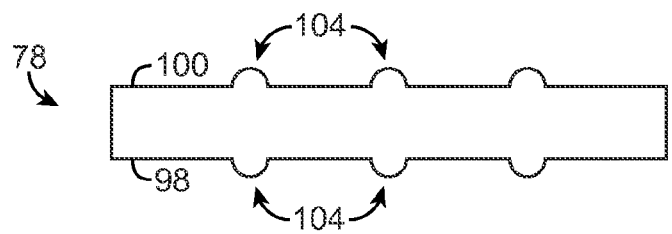
FIG. 13 is a cross-sectional side view of an illustrative light guide plate with light scattering bumps on both of its surfaces in accordance with an embodiment of the present invention.

FIG. 13 shows an illustrative configuration in which surface 100 of light guide plate 78 has been provided with light-scattering protrusions 104 and surface 98 of light guide plate 78 has been provided with light-scattering protrusions 104.

Figure 14:
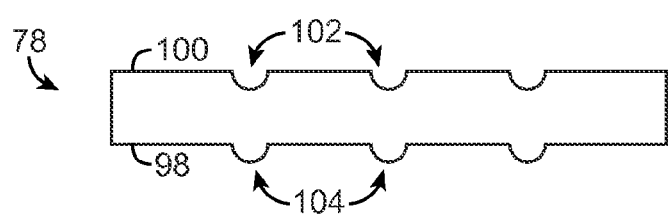
FIG. 14 is a cross-sectional side view of an illustrative light guide plate with light scattering pits on one surface and light scattering bumps on an opposing surface in accordance with an embodiment of the present invention.

In the example of FIG. 14, light-scattering plate 78 has been provided with one surface (surface 100) that has light scattering depressions 102 and an opposing surface (surface 98) that has light-scattering protrusions 104.

Figure 15:
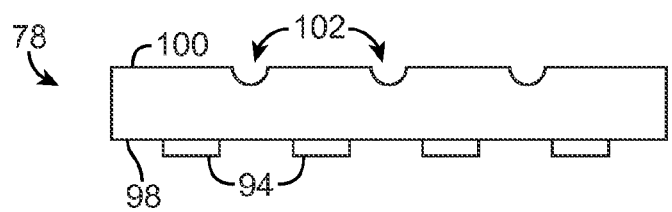
FIG. 15 is a cross-sectional side view of a light guide plate with printed light scattering features such as dots of ink in accordance with an embodiment of the present invention.

If desired, light-scattering structures such as structures 94 may be used alone or in combination with light-scattering protrusions 104 and/or light-scattering depressions 102, as shown by light-scattering structures 94 on surface 98 of light guide plate 78 of FIG. 15 and light-scattering depressions 102 on surface 100.

Figure 16:
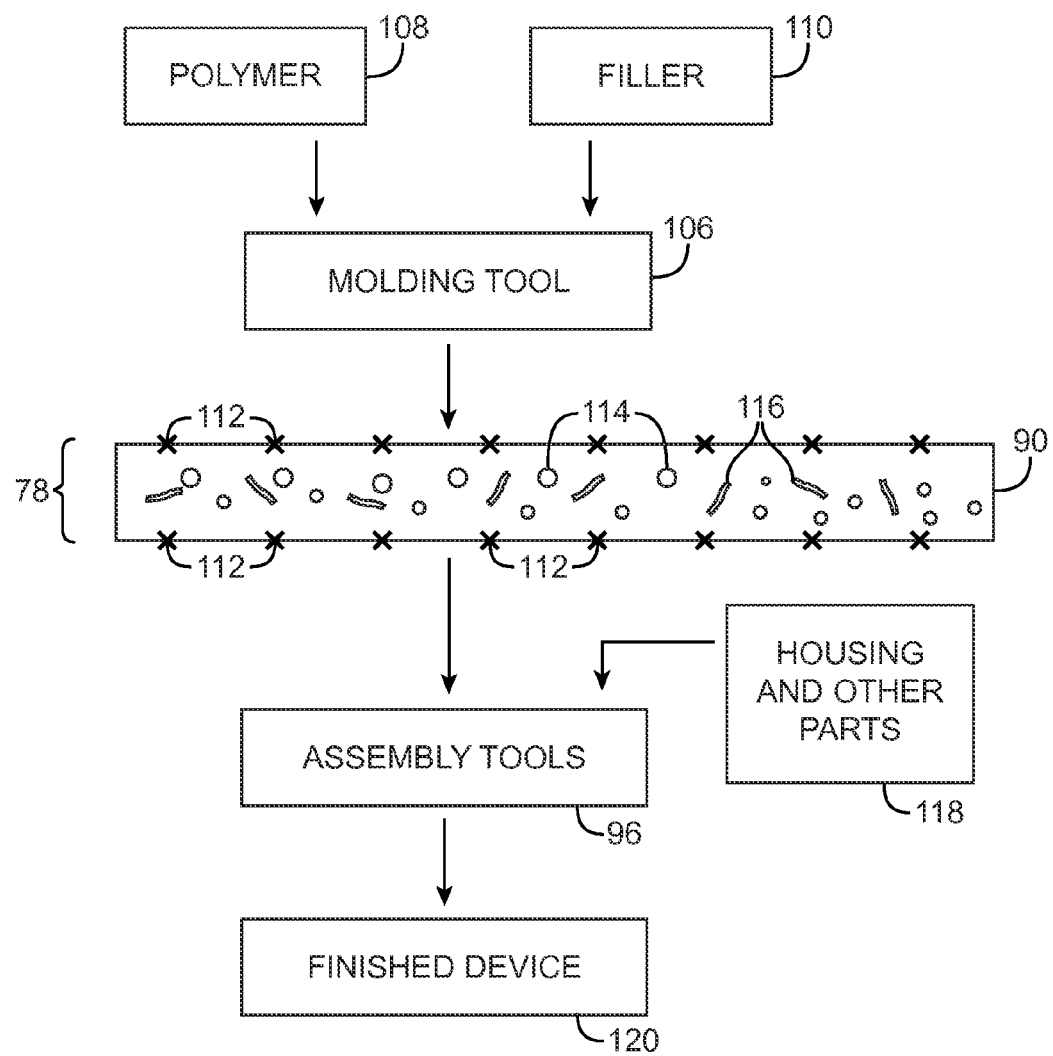
FIG. 16 is a diagram showing how filler material may be incorporated into a light guide plate to match the coefficient of thermal expansion of the light guide plate material to the coefficient of thermal expansion of a device housing and showing how the light guide plate and additional device parts such as a housing may be assembled to form a finished electronic device in accordance with an embodiment of the present invention.

Illustrative equipment for forming a polymer light guide plate with filler that adjusts the coefficient of thermal expansion of the light guide plate to a desired value matching that of housing 12 or other device structures is shown in FIG. 16. As shown in FIG. 16, equipment such as molding tool 106 may receive polymer material 108 (e.g., a clear resin such as a polymethylmethacrylate resin or other acrylic resin, a polycarbonate resin, etc.) and may receive filler material 110 such as fused silica, other glass filler material, or other filler material. The coefficient of thermal expansion of the filler material may be, for example, less than the coefficient of thermal expansion of the type of polymer associated with polymer material 108.

Molding tool 106 may mold polymer 108 and filler 110 into a substrate such as planar substrate 90 of FIG. 16, thereby forming light guide plate 78. The amount of filler that is incorporated into substrate 90 may be selected so that the coefficient of thermal expansion of light guide plate 78 (CTE2) falls within a desired range (e.g., CTEB to CTEA of FIG. 9) of the coefficient of thermal expansion CTE1 of housing 12. The filler material may include filler particles such as fused silica beads 114, fused silica fibers 116, a mixture of both fused silica beads and fused silica fibers, only glass beads, only glass fibers, or a mixture of glass beads, glass fibers, and/or other filler particles (e.g., irregular glass particles rather than spherical glass beads).

During the molding process or as part of a separate process, light-scattering features 112 may be formed on one or both surfaces of light guide plate substrate layer 90. Light-scattering surface features 112 may include, for example, protrusions 104, depressions 102, and/or printed ink surface features 94 (as examples). Light-scattering features 112 may be incorporated into light guide plate 78 when molding light guide plate substrate 90 using molding tool 106, using laser processing, using embossing, or using other fabrication techniques.

Following formation of light guide plate 78, light guide plate 78, other layers of display 14, housing 12, and other parts in electronic device 10 (shown as parts 118 of FIG. 16) may be assembled using assembly equipment 96, thereby forming finished electronic device 10.

The foregoing is merely illustrative of the principles of this invention and various modifications can be made by those skilled in the art without departing from the scope and spirit of the invention.

What is claimed is:

1. A display, comprising:
   display layers configured to display an image; and
   a backlight that provides light for the display layers, wherein the backlight includes a light source and a light guide plate that receives the light from the light source, wherein the light guide plate is formed from a polymer and a filler in the polymer, wherein the polymer has a coefficient of thermal expansion, wherein the light guide plate has a coefficient of thermal expansion, wherein the filler is configured to reduce the coefficient of thermal expansion of the light guide plate to less than the coefficient of thermal expansion of the polymer, and wherein the filler reduces the coefficient of thermal expansion of the light guide plate to match a coefficient of thermal expansion of a housing in which the display is mounted.

2. The display defined in claim 1 wherein the light guide plate has opposing planar surfaces that lie parallel to the display layers and wherein at least one of the surfaces includes light-scattering features.

3. The display defined in claim 2 wherein the light-scattering features include depressions.

4. The display defined in claim 2 wherein the light-scattering features include protrusions.

5. The display defined in claim 2 wherein the light-scattering features comprise printed ink light scattering features.

6. The display defined in claim 1 wherein the filler comprises glass particles.

7. The display defined in claim 1 wherein the filler comprises fused silica beads.

8. The display defined in claim 1 wherein the filler comprises fused silica fibers.

9. The display defined in claim 1 wherein the display layers comprise:
   a color filter layer;
   a thin-film transistor layer; and
   a liquid crystal layer between the color filter layer and the thin-film transistor layer.

10. An electronic device, comprising:
    a display housing having a coefficient of thermal expansion;
    display layers configured to display an image; and
    a light guide plate that conveys light to the display layers, wherein the light guide plate comprises:
       polymer having a coefficient of thermal expansion; and
       filler material that modifies the coefficient of thermal expansion of the polymer to match the coefficient of thermal expansion of the display housing.

11. The electronic device defined in claim 10 wherein the filler material is incorporated into the polymer so that the modified coefficient of thermal expansion is less than the coefficient of thermal expansion of the polymer.

12. The electronic device defined in claim 10 wherein the housing comprises a metal housing, wherein the display layers and the light guide plate form a display that is mounted in the metal housing.

13. The electronic device defined in claim 12 wherein the modified coefficient of thermal expansion of the polymer minus the coefficient of thermal expansion of the metal housing divided by the coefficient of thermal expansion of the metal housing is less than 2.5.

14. The electronic device defined in claim 13 wherein the modified coefficient of thermal expansion of the polymer minus the coefficient of thermal expansion of the metal housing divided by the coefficient of thermal expansion of the metal housing is less than 1.5.

15. The electronic device defined in claim 14 wherein the metal housing comprises an aluminum housing wall that is separated from an edge of the light guide plate by a gap of less than 0.4 mm.

16. The electronic device defined in claim 12 wherein the metal housing comprises an aluminum housing.

17. The electronic device defined in claim 12 wherein the filler comprises glass particles.

18. The electronic device defined in claim 17 wherein the glass particles comprise fused silica beads.

19. Apparatus, comprising:
    display layers that display an image;
    a light source;
    a metal housing having a coefficient of thermal expansion; and
    a light guide plate that conveys light to the display layers, wherein the light guide plate comprises:
       a polymer material having a coefficient of thermal expansion; and
       a filler in the polymer material, wherein the coefficient of thermal expansion of the light guide plate is configured by the filler in the polymer material to match the coefficient of thermal expansion of the metal housing.

20. The apparatus defined in claim 19 wherein the filler reduces the coefficient of thermal expansion of the light guide plate to less than the coefficient of thermal expansion of the polymer material.

* * * * *